United States Patent Office 3,449,469
Patented June 10, 1969

3,449,469
HIGH-IMPACT BLENDS OF POLYSTYRENE, ALFIN-CATALYZED RESINOUS COPOLYMER AND ALFIN-CATALYZED BUTADIENE RUBBER
Melvin F. Maringer, Cincinnati, Ohio, assignor to National Distillers and Chemical Corporation, New York, N.Y., a corporation of Virginia
No Drawing. Filed May 7, 1964, Ser. No. 365,779
Int. Cl. C08f 33/08, 19/08
U.S. Cl. 260—876                    8 Claims

ABSTRACT OF THE DISCLOSURE

A high-impact polystyrene molding composition containing (1) a resinous polymer of at least 70% by weight of a monovinyl aromatic hydrocarbon of the benzene series and up to 30% by weight of a monoalkenyl aromatic hydrocarbon comonomer, (2) an alfin elastomer selected from the group consisting of butadiene homopolymers and interpolymers of butadiene with either conjugated aliphatic dienes or monovinyl aromatic hydrocarbons, and (3) a tapered, alfin produced polymer produced by a process comprising alfin polymerizing in a first stage a composition comprising 50–100% conjugated hydrocarbon diene and 0–50% monovinyl aromatic hydrocarbon of the benzene series and thereafter, in at least one incremental polymerization step, introducing at least one of the conjugated hydrocarbon diene or the monovinyl aromatic compound polymerized in the first step and continuing polymerization under alfin conditions to produce a product having 4–30% conjugated hydrocarbon diene and 96–70% monovinyl aromatic hydrocarbon, the product being present in an amount of from 1–60% by weight in the molding composition.

This invention relates to high-impact polystyrene resin molding compositions and particularly to blended polystyrene molding compositions having improved impact strength combined with other desirable physical properties.

Considerable research has been directed toward the development of tough polystyrene molding compositions which are known to the art as high impact polystyrenes. Generally, these materials are copolymers or mixtures of homopolymers of a conjugated diene hydrocarbon with a major proportion of a polymerized vinyl aromatic monomer. It has also been proposed to prepare high impact polystyrene molding compositions by other techniques such as graft polymerization of styrene on a conjugated diene polymer and by combinations of such techniques, e.g., wherein homopolymers or copolymers of polystyrene are blended with rubbery copolymers obtained through graft polymerization techniques or tapered polymerization techniques. All of these prior art techniques have been attended by one or more disadvantages including undesirably long reaction times, difficult process control measures, a number of complicated and consecutive manipulations and complex equipment requirements. Moreover, and more importantly, the prior art methods utilized for obtaining polystyrene molding compositions with improved impact resistance have been generally found to result in the production of a product deficient in other important physical properties such as tensile strength and flexural stiffness, these deficiencies heretofore being accepted as the price of increased impact strength.

As briefly indicated above, the process of this invention involves the use of alfin catalysis. There exists a voluminous body of literature concerning alfin catalysts, methods of preparing the same and the use thereof in the polymerization of unsaturated organic compounds, particularly conjugated diolefinic hydrocarbons. These alfin catalysts as originally developed by A. A. Morton and co-workers may be defined as a complex of an alkali metal halide with the sodium compound of one or more methyl-n-alkyl carbinols and the sodium compound of one or more vinyl monoolefins, such vinyl monoolefin either having at least one alkyl group attached to a carbon atom of the vinyl group or having two alkyl groups attached one to each of the carbon atoms of the vinyl group. The preferred example of the alkali metal halide is sodium chloride. An example of the sodium compound of the methyl-n-alkyl carbinols is sodium isopropoxide. An example of the sodium compound of the vinyl monoolefins is allyl sodium. A particularly effective alfin catalyst is obtained when the sodium is employed as a finely divided dispersion, that is, a dispersion in which the maximum particle size is about 1 to 2 microns, such as may be prepared on a Gaulin mill. When such finely divided sodium is used, ordinary stirring devices may be employed instead of high-speed comminuting equipment. In addition, the use of finely divided sodium results in a 100% yield of amyl sodium and, therefore, in subsequent quantitative yields of sodium isopropoxide and allyl sodium. Thus, the alfin catalyst and consequently the end products of the polymerization are substantially free of metallic sodium contamination. Also, catalyst activity can be more readily reproduced when finely divided sodium (about 2 microns maximum particle size) is used. When maintained under an inert atmosphere, e.g., nitrogen or argon, the alfin catalyst appears to be stable almost indefinitely.

Though alfin catalysts have been found to be useful in the polymerization of conjugated diolefinic hydrocarbons and vinyl aromatic monomers such as styrene, as well as copolymers of such materials, they would not ordinarily be considered as desirable catalysts in the production of high impact polystyrene molding compositions comprising interpolymers or blends of polystyrene and conjugated diene hydrocarbons since conventional alfin polymerization results in the formation of polymers having such extremely high molecular weights. Thus, alfin elastomers have been characterized by molecular weights in excess of 2,000,000 and often over 5,000,000, while polystyrene produced through alfin catalysis has often been characterized by molecular weights in excess of 1,000,000. Because of such high molecular weights these polymers are very tough and exhibit little breakdown and extremely poor banding on being milled. Lacking tractability, they are very difficult to process using conventional equipment and conventional procedures, and attempts to compound them result in very rough stocks with relatively high shrinkage and exceedingly high viscosities.

There has recently been disclosed in copending application Ser. No. 311,199 to Schott et al., filed Sept. 24, 1963, now abandoned, a method for producing high impact polystyrene resins of improved physical properties which does involve the use of alfin catalysts. That method teaches the blending of alfin-produced elastomers with styrene-type resins, and discloses alfin polymerization of the elastomers in the presence of certain molecular weight moderators or certain novel alfin-type catalysts in order to substantially reduce the molecular weight of the elastomer. The elastomer having a molecular weight range of 50,000 to 1,250,000 is then blended with a styrene-type resin.

It has been more recently found that the above-discussed disadvantages of prior art methods may be avoided and improved polystyrene molding compositions obtained by polymerizing in the presence of an alfin catalyst in a first stage a composition comprising 50 to 100% (a) aliphatic conjugated diene and 0 to 50%, (b) monovinyl aromatic hydrocarbons of the benzene series having the vinyl radical attached directly to a carbon atom of the aromatic nucleus, and thereafter in at least one increment introducing a composition comprising at least one of (a) and (b) under alfin polymerizing conditions to the reaction product of the first stage in such proportions as to produce a composition having a final ratio of 4 to 30% (a) and 96 to 70% (b). This more recently discovered process may be conducted in the presence or absence of molecular weight moderators, though surprisingly it has been found that compositions of superior physical properties are obtained by conducting the process in the absence of molecular weight moderators.

Though the just described process is obviously relatively simple, the nature of the composition produced is not. That alfin catalysis yields conjugated diene polymers and styrene-type polymer of very high molecular weight is well known. It is believed to be fairly well established that such high molecular weight species result from some type of "living" polymer growth at a limited number of highly active catalyst sites. This type of mechanism affords a route to block copolymers when one monomer is exhausted and another entered.

The initial polymer formed in the above-described method, utilizing butadiene and styrene by way of example, is thought to comprise either a homopolymer of butadiene or a copolymer generally, predominantly butadiene. The initial polymer may be a block or random copolymer in a way not yet determined as far is is known. However, this initial copolymer is formed completely or nearly completely by the time the next monomer charge is added having a larger proportion of styrene or comprising all styrene. Therefore, due to the nature of the catalyst and polymerization methods, the second monomer charge tends to add to the end of the initial copolymer to form a new block of chain rich in styrene; i.e., the final copolymer chains will be block-type copolymers largely butadiene at one end and styrene at the other. Succeeding charges, if used, act similarly.

A complication is introduced into the polymerization mechanism by the ability of organo sodium catalyst components to transmetalate the polymer. It has been shown by Morton and co-workers that the alkyl sodium portions of the catalyst may transfer sodium to polymer as well as to monomeric olefins and diolefins. This transmetalation reaction allows the possibility of forming active catalyst sites along preformed polymer chains; and additions of monomer at such sites would afford graft copolymers, the new monomers being added to form side chains.

Further complications are introduced by the possibilities of uncovering previously inactive sites during polymerization (organosodium only) as reaction proceeds and initial active sites are covered with polymer. Thus, particularly in the latter stages of polymerization, some practically pure homopolymer may well be produced. Finally, the transmetalation-type reaction is able to cause gelation or partial gelation of polydienes in a way currently not defined, but undoubtedly involving a cross-linking mechanism. Thus, the total products of the above process are so complex as to not be accurately definable. It is hypothesized, however, that the high impact polystyrene resins produced by the proces are complex mixtupres of block, graft and conventional copolymers and homopolymers probably containing some random and cross-linked portions.

The just described process corresponds somewhat in terms of technique to that method known in the prior art as "tapered copolymerization." Utilizing conjugated diene and monovinyl aromatic hydrocarbons, e.g., butadiene and styrene, respectively, the tapered copolymerization method involves subjecting to polymerization a composition of monomers consisting of conjugated dienes alone or conjugated diene in major proportion with monovinyl aromatic monomer in a first stage whereby a copolymer chain richer in the conjugated diene is formed. In one or more further increments styrene or a monomer mixture of styrene and conjugated diene increasing in a styrene content is added to the polymerization reaction where it is hypothesized as described above that a combination of graft polymerization, block polymerization and conventional copolymerization as well as homopolymerization takes place as to ultimately result in a complex resin containing 70 to 96% of the vinyl aromatic monomer. Thus, it is possible to conduct the process in only two stages, where in the first stage a conjugated diene or a mixture of conjugated diene and vinyl aromatic monomer containing at least 50% conjugated diene is polymerized, and where in the second stage the monomer consisting only of monovinyl aromatic compound of a mixture containing a major quantity of monovinyl aromatic monomer with a minor amount of conjugated diene monomer is added to produce the final product. It is also contemplated that the process may be carried out in a number of stages, for example, three, four, five, six or more stages where in each increment the ratio of monovinyl aromatic monomer to conjugated diene monomer is increased. Moreover, it is possible to carry out the process substantially continuously wherein after the initial stage a feed mixture of monomers constantly being varied by conventional proportioning means is fed to the polymerization reactor so as to ultimately yield the final resin containing at least 70% polymerized vinyl aromatic monomer.

The alfin polymerization process is carried out in the presence of a hydrocarbon diluent at a temperature from about —40° C. to about 80° C. and preferably 20 to 50° C. and pressures varying from subatmospheric to superatmospheric. A slight positive pressure, e.g., 5 to 50 p.s.i.g. is preferred to retain monomer, and operating pressures above five atmospheres are not generally necessary.

In carrying out the above process, the aliphatic conjugated diene hydrocarbon, with or without added monovinyl aromatic monomer is contacted with an alfin catalyst in the presence of a hydrocarbon diluent and, as the polymerization proceeds, additional monomer feed containing increasing amounts of monovinyl aromatic monomer and decreasing amounts of conjugated diene hydrocarbon are added until the monomer feed is completely or substantially completely monovinyl aromatic monomer. This technique of varying the compositions of monomer feed may be carried out semicontinuously in definite stages so that all entered monomer is substantially consumed prior to entry of the next feed composition or it may be carried out by gradually varying the monomer feed composition as polymerization progresses to produce a cascade of polymer-copolymer additives; or a combination of these extremes of the technique may be used. When the desired ratio of total monomer fed is reached, polymerization is allowed to proceed substantially to completion and the finished composition is obtained after removal of catalyst residues and diluent, for example, by washing with water and evaporating volatile diluent.

The conjugated diene monomers useful in the process include aliphatic or aromatic substituted aliphatic conjugated hydrocarbon dienes having from four to eighteen carbon atoms such as butadiene-1,3, isoprene, 2,3-dimethylbutadiene-1,3, 1-phenylbutadiene-1,3, 2,3-diphenylbutadiene-1,3, piperylene, 1-phenyl-3-methylbutadiene-1,3, myrcene, and the like. Preferred monomers are the aliphatic conjugated hydrocarbons having four to six carbon atoms.

The vinyl aromatic hydrocarbons of the benzene series having the vinyl radical directly attached to a carbon atom of the aromatic nucleus include styrene, vinyl toluene, vinyl xylene, ethylvinyl benzene, isopropenyl benzene, chloro styrene, ethylvinyl toluene, isopropylvinyl benzene and diethylvinyl benzene. Mixtures of the above may also be employed, particularly a mixture of vinyl benzene containing 0.5 to 20% isopropenyl benzene.

The hydrocarbon diluent employed in the polymerization reaction may be substantially any hydrocarbon solvent inert to the alfin catalyst and may be aliphatic, for example, pentane, hexane, heptane, cyclohexane, isooctane, and the like or aromatic, for example, benzene. The hydrocarbon diluent may also contain olefinichydrocarbons such as pentene, hexene and cyclohexene, for example, but should be essentially free of moisture and acetylenic compounds. While the olefinic hydrocarbons may be used as partial or total diluent, saturated hydrocarbons are preferred.

As previously indicated the monomer polymerized in the initial stage of this process is preferably a conjugated diene hydrocarbon, though up ot 50% of a vinyl aromatic monomer may also be present.

The monomers polymerized in successive intermediate stages of the process may be all vinyl aromatic monomers or mixtures with conjugated diene hydrocarbons and with increasing proportions of the former being incorporated in each stage.

The monomer polymerized in the final stage of the process is preferably all monovinyl aromatic monomer, but a minor amount of conjugated diene hydrocarbon, e.g., up to about 10% may be present with the monovinyl aromatic monomer at the final stage.

The final composition may contain up to about 30% incorporated conjugated diene hydrocarbon, but it is preferred that the final composition represent a ratio of 75 to 96 parts monovinyl aromatic monomer to 4 to 25 parts conjugated aliphatic diene monomer.

The hydrocarbon diluent may be used in amount such that the final copolymer or polymer mixture at the completion of polymerization is in up to about 50% concentration in the diluent, though concentrations of about 5 to 20% are preferred for ease of handling.

Times of polymerization required for the operation of the above process are relatively short depending upon such factors as the catalyst composition and concentration, temperature, the particular monomers entered, and the type of reactor used. In batch processes, the polymerization time for each stage need not exceed four hours and may be as low as one hour or less when more than a two-stage process is employed. In any event, a final stage of polymerization time of one to ten hours is preferred to insure complete monomer conversion. In a semi-continuous process a residence time of 0.25 to 0.5 hour is preferred at each stage with the provision that a finishing period of 0.5 to 5 hours is preferred at the final stage. In a continuous process, a final semicontinuous finishing period of 0.5 to 5 hours is preferred to insure maximum monomer conversions.

The amount of catalyst employed in the taper-type polymerization process may vary over a considerable range, generally about 0.1 to about 10 weight percent, based on the total sodium content of the catalyst, referring to the weight of all the monomers added over the course of the reaction, and is preferably about 0.5 to 5.0 weight percent. Less catalyst is required for highly purified monomers; more when impurities and inhibitors are present.

The manner of incorporating the alfin catalyst into the reaction mixture may be varied. Generally, the alfin catalyst is added to the initial monomer reactants in sufficient amount so as to catalyze the polymerization throughout subsequent additions of monomer. In other words, the amount of catalyst added in the initial stage is calculated on the basis of total monomer weight to be charged throughout the process. Alternatively, catalyst may be added with some or all of the additions of monomer.

As another alternative procedure the catalyst is added to the initial reaction stage in a minimum quantity, i.e., the minimum amount necessary to initiate polymerization. This minimum quantity, in any given polymerization, can be determined by visual observation by gradually introducing catalyst until agglomeration occurs, indicating that polymerization has been initiated by a minimum quantity of catalyst. Upon substantial completion of the first stage polymerization reaction, the remaining catalyst may thereafter be metered into the reaction zone along with added monomers, the amount of catalyst introduced in each stage being proportioned to the amount necessary generally to accomplish polymerization of the total quantity of monomer introduced by the completion of that stage. Without wishing to be bound by any theory, it is believed that this technique of incremental catalyst addition with minimum initial catalyst results in the production of an initial polymer having an increased molecular weight as compared to the initial polymer produced by the first technique. Moreover, it has been found that the high impact polystyrene composition produced displays a major increase in elongation and a decrease in insoluble gel content along with excellent impact strength.

As described in copending application Ser. No. 359,766, filed Apr. 14, 1964, in the name of Pritchett, the incremental monomer addition process described above may be modified by utilizing in a final monomer addition compounds other than the monovinyl aromatic hydrocarbon monomers and conjugated hydrocarbon dienes to produce compositions in the nature of terpolymers having somewhat variable properties. In other words, this technique permits greater flexibility in the tailoring of physical properties to suit particular end uses. This third class of monomers comprises polymerizable polarsubstituted vinyl-type compounds. More particularly, this third class of monomers comprises vinyl-type compounds containing elements other than carbon and hydrogen only, which may be represented by the formula:

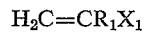

wherein $R_1$ is selected from the group consisting of hydrogen, alkyl, aryl, substituted alkyl or aryl, and $X_2$; and $X_1$ and $X_2$ are polar groups containing at least one atom other than carbon or hydrogen. Preferably, in this third class of monomers represented by the above formula $X_1$ and $X_2$ are selected from the group of radicals contaning elements other than carbon or hydrogen so arranged as to activate the vinyl-type group. Most preferably the third class of monomers comprises vinyl and vinylidene compounds having two to thirty carbon atoms and the formula:

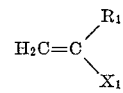

wherein $R_1$ is hydrogen, alkyl, aryl, substituted alkyl or aryl, or $X_2$; $X_1$ and $X_2$ being selected from the group of polar radicals consisting of halogen, nitrile, —OCOR', —COOR', —COR', —OR', —SR', —SOR', —SO$_2$R', —SO$_3$R', —OSO$_2$R', —NR'R'', —CONR'R'' and —NR'COR'' wherein R' and R'' are alkyl, aryl or substituted alkyl or aryl; with the provision, however, that no hydroxyl, primary or secondary amine, oxirane or terminal acetylenic groups are present.

The third class of monomers includes such compounds as vinyl and vinylidene halides, ethers, esters, ketones, sulfides, sulfones, sulfoxides, sulfonic esters, t-amines, substituted amides and nitriles as well as acrylate-type derivatives such as esters and amides of acrylic and methacrylic acids. Examples of the third class of monomers described in copending application Ser. No. 359,766, although practice is not limited thereto, are: vinyl chloride, vinyl bromide, vinylidene chloride, vinylidene cyanide, alpha-chloroacrylonitrile, acrylonitrile, methacrylonitrile, alpha - difluoromethyl acrylonitrile, alpha - trifluoromethyl acrylonitrile, alpha-cyclohexenyl acrylonitrile, 2-, 3- or 4-chlorostyrene, 4-ethoxystyrene, 2-vinyl pyridine, 2-methyl-5-vinyl pyridine, 1-vinyl isoquinine, vinyl furan, vinyl trimethoxysilane; N-vinyl-N-methyl-N'-N'-dimethyl urea, the vinyl esters and as well the N-vinyl-N-alkyl and N-vinyl-N-aryl amides of such acids as formic, acetic, propionic, butyric, isobutyric, 2-ethyl butyric, 2-ethyl hexanoic, stearic, eleostearic, cyclopropanecarboxylic, cyclohexanecarboxylic, decalin-2-carboxylic, benzoic, phenyl acetic, toluic, dimethyl benzoic, naphthoic, furoic, theonic, 2-furyl acetic, nicotinic, 3-fluoropropionic, o-, m-, or p-chlorobenzoic, 4-methoxybutyric, o-, m-, or p-methoxybenzoic, 4-phenoxy-2-methyl butyric, 2-ketocyclohexyl acetic and o- or, p-acetobenzoic; ester and N,N-disubstituted amides of acrylic-type acids such as acrylic, methacrylic, alpha-chloroacrylic, alpha-acetoxyacrylic, alpha-trifluroacetoxyacrylic, etc., including esters of alcohols such as methyl, ethyl, propyl, isopropyl, 1- and 2-butyl, t-butyl, 2-ethyl-1-hexyl, octyl, cyclohexyl, 4-methyl cyclohexyl, allyl, benzyl, 2-phenyl ethyl, cumyl, furfuryl, 2-thienyl, tetrahydrofurfuryl, 2-cyclohexenyl, 2-n-butoxyethyl, 2-cyanoethyl, trifluoroethyl, hexadecafluorononyl and 4-chlorobutyl, and including N,N-disubstituted amides such as the dimethyl, methyl ethyl, diethyl, dibutyl, ethyl cyclohexyl, diallyl, diphenyl, phenyl butyl, furyl ethyl, thienyl phenyl and di-3-pyridyl amides as well as amides of cyclic amines such as piperidine, morpholine and decahydroquinoline; vinyl ethers, sulfides, sulfoxides, sulfones, sulfonates and sulfonate esters such as the methyl, ethyl, propyl, isopropyl, butyl, t-butyl, cyclohexyl, 2-ethoxyethyl, 2-dimethylaminoethyl, phenyl, allyl, benzyl, furfuryl, thienyl, and pyridyl, derivatives; and N-vinyl-N,N-disubstituted tertiary amines such as N-vinyl-N,N-dimethyl, N-vinyl-N-methyl-N-phenyl, N-vinyl-N,N-dibutyl, N-vinyl-N,N-diphenyl, N-vinyl-N-ethyl-N-furyl and N-vinyl-N,N-dipyridyl amines as well as cyclic derivatives such as N-vinyl piperidine, N-vinyl morpholine, 1-vinyl-2-pyrrolidone, N-vinyl carbazole and N-vinyl decahydroquinoline.

In any event, the substituted vinyl monomers must be free of highly reactive hydroxyl, acetylenic hydrogen, primary and secondary amine or oxirane groups since such groups are highly destructive of the catalyst. Though certain of the other vinyl substituted monomers such as the ester or nitrile-containing monomers may also have some tendency to destroy the catalyst, this can generally be avoided according to an embodiment of the invention described in copending application Ser. No. 359,766 by making sure that the conjugated diene and vinyl aromatic hydrocarbon monomers are substantially completely reacted before the addition of the third group of monomers thereby substantially covering the catalyst and protecting it from rapid deactivation due to the third group of monomers. Moreover, addition of the polar-substituted vinyl monomers at lower temperatures, preferably at −80° C. to 0° C., will substantially reduce or eliminate catalyst deactivation.

The amount of a third monomer from the class of polymerizable polar-substituted vinyl-type compounds which may be employed usefully in the just described process may represent up to about 35% by weight of the total composition, although it is preferred that not more than about 25% by weight of the third monomer be included. Two or more of the monomers from the third class above described may be added in combination, provided that the total amount of these monomers does not represent more than about 35%, and preferably not more than about 25% by weight of the total composition. Otherwise stated, compositions according to the above described process and produced from monomers selected from the three classes (a) conjugated dienes, (b) monovinyl aromatic hydrocarbons, and (c) polymerizable polar-substituted vinyl-type compounds should lie within the composition range 1–30% (a), 35–95% (b) and up to about 35% (c); or preferably within the composition range 3–30% (a), 45–90% (b) and 3–25% (c).

In the practice of above-described taper-type processes the physical properties of the molding compositions produced may be further varied by incorporating a cross-linking agent in the initial polymerization stage or incrementally in the second stage of a two-stage process or in each of the subsequent stages of a multi-stage or continuous process in the manner described in copending application Ser. No. 361,873 in the names of Pritchett and Rowland, filed Apr. 22, 1964.

Though the use of cross-linking agents to increase molecular weight had been suggested as beneficial in certain prior art processes, it was unexpected to find that this modification would be of advantage in the above described methods since alfin-produced polymers are well known as being intractable because of their extremely high molecular weight. To find that the tractability and other physical properties of the compositions were improved by the use of cross-linking agents with increasing of the molecular weight therefore flew in the face of ordinary experience and expectation.

The cross-linking agents which may be employed are generally those divinyl-type monomers which have dual functionality. These divinyl-type cross-linking agents may be represented by the formula:

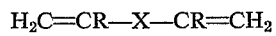

wherein R is hydrogen or lower alkyl and X is a substituted or unsubstituted aliphatic or aromatic divalent radical which is inert to the polymerization reaction. Preferably, the divinyl-type cross-linking agents are 4–18 carbon atom compounds of formula:

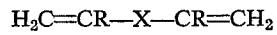

wherein R is hydrogen or methyl and X is a diradical as just described, e.g., phenylene, naphthylene, pyridylene, furylene, thienylene, pyrrolidylene, and alkyl substituted homologues thereof; vinylene and ethinylene; ethylenedioxy, propylenedioxy and butylenedioxy;

wherein R' is phenylene or $(CH_2)_n$ wherein $n=1-8$;

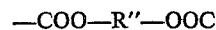

wherein R" is ethylene, propylene or butylene; and oxy, thio, sulfinyl, sulfonyl, carbonyl, and alkyl or aryl imino. Examples of divinyl-type cross-linking agents suitable for use in the process of this invention include divinyl benzene, diisopropenyl benzene, isopropenyl vinyl benzene, divinyl toluene, divinyl naphthalene, divinyl pyridine, divinyl picoline, 1,3,5-hexatriene, divinyl acetylene, divinyl terephthalate, divinyl adipate, divinyl sebacate, ethylene diacrylate, 1,2-propylene dimethacrylate, divinyl ether, divinyl sulfide, divinyl sulfone, divinyl sulfoxide, divinyl ketone, vinyl methacrylate, divinyl carbonate, N-phenyl-N,N-divinyl amines and the like.

The amount of cross-linking agent used may represent up to 1% by weight of the final composition, but it is preferred to use from 0.1 to about 0.5%.

The use of cross-linking agents effects quite desirable improvements in the properties of the high impact compositions produced thereby. For example, both tensile and impact strength may be increased simultaneously by modifying the taper-type alfin copolymerization processes described above with divinyl-type cross-linking agents. Although the mechanism of such modification is incompletely understood, it has been observed that a measure of product control may be exerted by judicious choice in the time of entry of a cross-linking agent into the tape-type alfin copolymerization. For example, when divinyl benzene is introduced with the major or initial portion of the conjugated diene monomer in the process utilizing a final polar-substituted vinyl-type compound, the terpolymer like product impact strength increases rapidly while tensile strength and gel content increase moderately. On the other hand, when divinyl benzene is introduced after the major or initial portion of conjugated diene monomer has polymerized, tensile strength and gel content increase rapidly and impact strength only moderately. Alternatively, more than one addition of cross-linking agent may be made to obtain further control of property modifications; e.g., in a continuous process part of the cross-linking agent may be added with the initial monomer charge and the remainder at a point in the process where the major portion of the conjugated diene monomer has been polymerized. As another alternative, the divinyl-type cross-linking agent may be proportioned continually into the copolymerization reaction as it proceeds.

When cross-linking agents are used, the choice of whether to add the larger portion of cross-linking agent initially or later in the polymerization will depend upon: (a) the particular balance of polymer properties desired and (b) the nature of the cross-linking agent. When only moderate increase in tensile strength compared to impact strength is desired, all or a major part of the cross-linking agent will be introduced at the beginning of the polymerization. When either (a) high tensile-impact strength combinations are desired or (b) the divinyl-type cross-linking agent contains highly reactive carbonyl, sulfinyl or sulfonyl groups which tend to destroy unprotected catalyst; the cross-linking agent will be introduced after most of the initial monomer charge has polymerized.

Though as has been stated previously, the high-impact polystyrene compositions produced by the above described processes are of such complex nature as to make it impossible to accurately define them with certainty, they will hereafter be referred to for the purpose of simplicity in defining the present invention as "taper-produced polymers" or "taper-produced compositions" since the process of preparation corresponds somewhat in terms of technique to that method known in the prior art as "tapered copolymerization."

According to the present invention blended high-impact polystyrene compositions are prepared by mixing two or more types of the previously described taper-produced polymers with each other or mixing at least one such taper-produced polymer with molecular weight modified alfin polymers hereinafter described. By virtue of this invention, compositions may be produced having widely varying properties tailored for particular end uses by blending an unmodified polymer produced by the above-described sequential addition process with one which has been modified by the interpolymerization of a polar-substituted vinyl monomer and/or one which includes a cross-linking agent of the nature described previously. Moreover, it may be desired to blend a first unmodified type having a particular ratio of hydrocarbon conjugated diene to monovinyl aromatic hydrocarbon with a second having a different ratio. Furthermore, any taper-produced composition prepared according to the above processes may be blended with polystyrene-type resins or conventional elastomers such as copolymers of butadiene-styrene, butadiene-isoprene, butadiene-isoprene-styrene, as well as such elastomers produced by alfin catalysis. In all such blends the taper-produced polymer may range from 0.5 to about 99.5% by weight of the total blend. A preferred range is 1 to 60%. The final ratio will depend upon the nature of the particular properties desired in the final blend, as for example the impact resistance thereof and the compatibility of the blended composition. In any case the components of the blend should be present in such proportions as to yield a blended composition containing from about 4 to 30% by weight of combined hydrocarbon conjugated diene.

The blending of the taper-produced polymers with polystyrene-type resins or with various elastomeric polymers should be conducted so as to obtain a substantially homogeneous distribution of ingredients. The components can be blended or incorporated with one another in any of the conventional ways, e.g., by heat plastifying the ingredients and mechanically working the same in admixture with one another on compound rolls, in a Banbury mixer or a plastics extruder, to obtain a uniform or substantially uniform heat-plastified mass containing the polymeric ingredients in the desired proportions. This heat-plastified mass is then fabricated to a finish product or cooled and subdivided into a form suitable for subsequent fabrication, i.e., molding, extrusion and the like.

In addition, inert ingredients such as stabilizers, lubricants, antioxidants, pigments and inert fillers can be incorporated by the same blending procedure at the same time or by a subsequent blending process.

Blending conditions will depend on the characteristics of the resinous and elastomeric polymers being blended and upon the equipment employed for the blending process. Blending temperatures may vary from about 200° F. to about 500° F. and blending time may vary from about a few seconds to about 2 hours. Temperatures of 250–350° F. and a time of 30–60 minutes are generally preferred when blending is performed with a two-roll rubber compounding mill.

By the term "polystyrene-type resin" it is intended to mean one or more polymerized monovinyl aromatic hydrocarbons of the benzene series having the vinyl radical directly attached to a carbon atom of the aromatic nucleus, such as styrene, vinyl toluene, vinyl xylene, ethyl vinyl benzene, chlorostyrene, ethyl vinyl toluene, isopropyl vinyl benzene or diethyl vinyl benzene. Also included within the terms are interpolymers of at least 70% by weight of one or more of such monovinyl aromatic hydrocarbons with 1 to 30% by weight of an alpha alkyl styrene, such as alpha-methyl styrene, para-methyl-alpha-methyl styrene, or alpha-ethyl styrene. The preferred polystyrene-type resins or alkenyl aromatic resins are polystyrene, polyvinyl toluene, copolymers of styrene and vinyl toluene, and copolymers of 70 to 85% by weight of styrene and from 30 to 15% by weight of alpha-methyl styrene.

The preferred polystyrene-type resin should have a molecular weight and physical property characteristics such that it can be employed alone for fabrication by molding, extrusion, etc. into articles of hardness, toughness and utility as exemplified by the polystyrene-type resins in use commercially at present. These resins should have a molecular weight of at least 30,000 or greater, preferably a molecular weight between 50,000 and 500,000 as determined by the Staudinger viscosity method (Schildknecht, "Vinyl and Related Polymers," New York, Wiley, 1952, pp. 30–31). The polystyrene-type resins may be prepared by any of the well-known polymerization processes disclosed in the prior art or by the use of alfin catalyst polymerization in the manner taught by A. A. Morton in numerous publications and in U.S. Patent 3,223,691, Greenberg et al., Dec. 14, 1965.

A particularly desirable blended composition having especially improved toughness, impact properties and processing ability is prepared according to the present invention by intermixing one or more of the previously described taper-produced polymers with (1) a polystyrene-type resin and (2) an elastomer consisting of a butadiene homopolymer or interpolymer of at least about 45% by weight butadiene and at least one monomer selected from the group consisting of conjugated aliphatic dienes and monovinyl aromatic hydrocarbons of the benzene series which elastomer is produced by alfin catalysis and has a molecular weight of 50,000 to 1,250,000. It is preferred that the ratio of the taper-produced polymers to (1) and (2) be 1–25% taper-produced polymers, 50–98% (1) and 1–25% (2).

The elastomers produced by alfin catalysis and having a molecular weight in the range of 50,000 to 1,250,000 may be produced in the manner described in U.S. Patent 3,067,187 to Greenberg et al., as well as in U.S. Patent 3,233,691, Greenberg et al., Dec. 14, 1965, and in copending application Ser. No. 271,615, filed Apr. 9, 1963, now abandoned, in the names of Greenberg et al., wherein conventional alfin catalysts are employed in combination with a molecular weight modifier to yield elastomers having molecular weights in the desired range rather than the extremely high molecular weight alfin elastomers normally produced without the use of modifiers. These polymers may constitute homopolymers of conjugated aliphatic dienes, e.g., butadiene, or interpolymers thereof with other conjugated aliphatic dienes with or without the presence of alkenyl aromatic monomers. As disclosed in said patent and copending application, the elastomers of lower molecular weight are prepared by polymerization in the presence of an alfin catalyst and certain dihydro derivatives of aromatic hydrocarbons, preferably 1,4-dihydrobenzene and 1,4-dihydronaphthalene which act as molecular weight moderators. Since the method is fully described in U.S. Patent No. 3,067,187, no detailed description of the process is required here and the disclosure of said patent is hereby incorporated by reference.

Alfin catalyzed elastomers having a molecular weight in the range of 50,000 to 1,250,000 may also be produced according to the method described in U.S. Patent 3,380,984 to Birchall and Allgeier which describes carrying out the polymerization in the presence of an alfin-type catalyst comprising an intimate mixture in an inert diluent of an alkali metal salt of a methyl-n-carbinol, a finely divided alkali metal halide and a dialkali metal diallylic-type hydrocarbon compound selected from the group represented by the formulae (1)

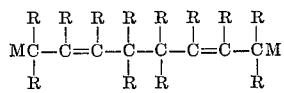

wherein M is an alkali metal, and R is selected from the group consisting of hydrogen and a saturated hydrocarbon radical, of from 1 to 4 carbon atoms, and (2)

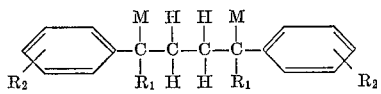

wherein $R_1$ and $R_2$ are selected from the group consisting of alkyl groups having one to four carbon atoms and hydrogen atoms, and M is an alkali metal. By employing an alfin catalyst of the above type as described in the just mentioned copending application, it is not necessary to utilize molecular weight moderators to obtain lower molecular weight alfin polymers, though such moderators may optionally be employed if desired.

In order to more clearly illustrate the practice of the present invention, the following examples are presented wherein parts are given by weight unless otherwise specified. These examples are intended as illustrative only, and the invention should not be limited thereby except as indicated by the appended claims.

PREPARATION OF ALFIN CATALYST

The preparation of the alfin catalyst employed in the examples was carried out as follows:

Dry hexane (660 parts) was charged to a 3-necked flask provided with stirrer, inert gas sweep, a dry ice reflux condenser system, and an external cooling bath. To this was added 132.4 parts of a dispersion of finely divided sodium (2 microns maximum particle size) (36.8 parts, 1.6 atoms) in alkylate. The slurry was cooled to −10° C., and 102 parts of dry n-amyl chloride (0.84 moles) was added slowly with moderate stirring which was continued for one hour after the addition had been completed. Then 30.6 parts of isopropyl alcohol (0.4 mole) was added slowly. Stirring was then maintained for an additional 45 minutes. Excess dry propylene (C.P. grade) was subsequently introduced into the mixture, the temperature of which was maintained at −10° C. until active reflux of the propylene occurred. The temperature was then raised gradually to 25° C., and the mixture was stirred at this temperature for two hours. During the last 15 minutes the propylene was allowed to leave the system and was collected for recycle. The reaction slurry was transferred to a storage vessel maintained in an inert atmosphere of argon and was then diluted to 1120 parts with dry hexane. This slurry, that is, the alfin catalyst, contained 0.4 mole of sodium isopropoxide, 0.4 mole of allyl sodium, and 0.8 mole of sodium chloride per 1120 parts; or 0.025 mole of sodium isopropoxide, 0.025 mole of allyl sodium and 0.05 mole of sodium chloride per 70 parts.

Examples 1–4

POLYMER A (TAPER PRODUCED)

A quart soda bottle (0.828 liter) fitted with a screw top pressure seal cap was used as the polymerization reactor. To the bottle was charged 365 parts dry hexane, 10.22 parts butadiene, 1.13 parts styrene and 0.36 part divinyl benzene under nitrogen atmosphere at about −15° C. Then 70 parts alfin catalyst suspension was injected and the bottle was sealed and shaken. The reaction was allowed to proceed at ambient temperature for 2 hours with occasional shaking. The bottle was then opened under nitrogen, 90.85 parts styrene was added, the bottle was quickly resealed and polymerization was allowed to proceed 2 hours more with occasional shaking to keep the contents mixed.

The graft-block polymer was removed from the bottle as a thick, semisolid mass swollen with solvent. It was washed in a Waring Blendar three times with 100 parts 180-proof ethanol containing 0.2% N-phenyl-β-naphthylamine antioxidant, and three times with 100 parts water. The last wash was with 100 parts acetone. The product was dried at 50° C. and 2 mm. Hg to yield 104.4 parts by weight of finished polymer. Polymer gel content was 31.5%.

POLYMER B (MOLECULAR WEIGHT MODIFIED ALFIN-PRODUCED COPOLYMER)

A quart soda bottle (0.828 liter) fitted with a screw top pressure seal cap was used as the polymerization reactor. To the bottle was charged 365 parts dry hexane, 17 parts 1,4-dihydronaphthalene molecular weight control modifier solution (containing 13.3% dihydronaphthalene), 86.4 parts butadiene, and 15.5 parts styrene under nitrogen atmosphere at about −15° C. Then 70 parts alfin catalyst suspension prepared as described above was injected and the bottle was sealed and shaken. The reaction was allowed to proceed at ambient temperature for 2 hours with occasional shaking. The bottle was then opened and a rubbery copolymer removed. Using a Waring Blendor the polymer was washed 3 times with 100 parts 180-proof ethanol containing 0.2% N-phenyl-β-naphthylamine antioxidant, then 3 times with 100 parts water, and then once with 100 parts acetone. The product was dried at 50° C. and 2 mm. Hg to yield 99.8 parts by weight of rubbery copolymer. The copolymer having a molecular weight of 195,000 was checked for polymer gel content and found to be zero.

BLENDS

Four blends having different proportions of ingredients were prepared by intermixing on a two-roll compounding mill polymers A and B with general purpose polystyrene resin [having a melt index flow rate ($I_2$) of 0.80 gm./10 minutes] and having a molecular weight of 100,000 as determined by the Staudinger method. To the general purpose polystyrene resin fluxing on a warm (225–250° F.) mill were added polymers A and B. The polymers were fluxed on the mill at 300–325° F. until substantially homogeneous (until the pearly luster disappeared) which required mixing times varying from 30 to 60 minutes. The blends were then removed from the mill as a sheet and cooled and granulated. The subdivided blend was injection molded into physical test specimens using a 1 oz. Mini-jector molder. The compositions of the four blends is reported in the following Table I, while the physical properties determined by standard ASTM testing procedures are reported in Table II. In comparison runs with blends prepared from alfin catalyzed rubbery copolymers and polystyrene resins without the inclusion of taper-produced polymers prepared by the process described above it was found that the combination of physical properties obtained, e.g., tensile strength, flexural stiffness, hardness, and impact strength were substantially less desirable.

TABLE I.—COMPOSITION OF BLENDED RESINS

| | Examples | | | |
|---|---|---|---|---|
| | 1 | 2 | 3 | 4 |
| (1) Polymer | B | B | B | B |
| Parts by weight | 10.6 | 8.8 | 10.6 | 10.0 |
| Polymer gel content (wt. percent) | 0 | 0 | 0 | 0 |
| (2) Polymer | A | A | A | A |
| Parts by weight | 1.1 | 2.8 | 10.0 | 15.0 |
| Polymer gel content (wt. percent) | 31.5 | 31.5 | 31.5 | 31.5 |
| (3) General purpose polystyrene (parts by weight) | 88.3 | 88.4 | 79.4 | 75.0 |
| Styrene:butadiene ratio of blend | 91:9 | 92:8 | 90:10 | 90:10 |

TABLE II.—PHYSICAL PROPERTIES OF BLENDER RESINS

| | Examples | | | |
|---|---|---|---|---|
| | 1 | 2 | 3 | 4 |
| Tensile strength (p.s.i.) | 5100 | 5000 | 4800 | 4900 |
| Elongation (percent) | 30 | 30 | 32 | 34 |
| Flexural stiffness (p.s.i.) | 162,000 | 158,000 | 151,000 | 152,000 |
| Hardness (Durometer D) | 83 | 83 | 82 | 81 |
| Izod notched impact (ft. lbs./in.) | 0.62 | 0.60 | 0.83 | 0.80 |
| Wt. percent graft copolymer | 1.1 | 2.8 | 10.0 | 15.0 |
| Overall styrene: butadiene weight ratio of blend | 91:9 | 92:8 | 90:10 | 90:1 |

The amount of polymer gel content in the alfin-produced polymer is determined by immersing the rubbery polymer in toluene and centrifuging to obtain the insoluble gel portion. Approximately 0.2 part by weight of elastomer are immersed in approximately 100 parts by volume of toluene and centrifuged for 8 hours. The insoluble swollen gel portion is then filtered from the solution of the soluble portion and dried under vacuum to remove all solvents. The weight of dried insoluble gel portion divided by the total weight of the polymer immersed in the solvent is the weight fraction of polymer gel present. Multiplication by 100 yields the weight percent polymer gel present in the elastomer.

There has been described in the above specification, high impact molding compositions having widely variable and excellent combinations of physical properties utilizing taper-produced alfin polymers.

Many modifications to this invention will be apparent to those skilled in the art upon study of the foregoing disclosure. Such modifications are deemed to be within the spirit and scope of this invention.

What is claimed is:

1. A high-impact polystyrene molding composition comprising a blend of
   (1) a resinous polymer of at least 70% by weight of a monovinyl aromatic hydrocarbon of the benzene series and up to 30% by weight of a monoalkenyl aromatic hydrocarbon comonomer,
   (2) a synthetic elastomer produced by polymerization in the presence of an alfin catalyst consisting essentially of a sodium alkoxide, a sodium alkenyl compound, and an alkali metal halide, consisting of at least one polymer selected from the group consisting of
      (A) butadiene homopolymers and
      (B) interpolymers of at least about 45% by weight butadiene with at least one monomer selected from the group consisting of conjugated aliphatic dienes and monovinyl aromatic hydrocarbons of the benzene series, said elastomer (2) having a molecular weight of 50,000 to 1,250,000 and
   (3) a composition produced by the steps comprising polymerizing in the presence of an alfin catalyst as heretofore defined in a first stage a composition comprising
      (a) 50 to 100% conjugated hydrocarbon diene and
      (b) 0 to 50% monovinyl aromatic hydrocarbons of the benzene series having the vinyl radical attached directly to a carbon atom of the aromatic nucleus, and thereafter in at least one increment introducing at least one member selected from the group consisting of (a) and (b) under alfin-polymerizing conditions to the reaction product of the first stage in such proportions as to produce a composition having a ratio of 4 to 30% (a) and 96 to 70% (b), wherein (3) is present in an amount from about 1% to about 60% by weight and wherein the combined amount of conjugated diene in said blend is from about 4% to about 30%.

2. A high-impact polystyrene molding composition according to claim 1 wherein (3) is present in an amount of 1–25%.

3. A composition according to claim 1 wherein (1) is polystyrene, (2) is a copolymer of butadiene and styrene, (a) is butadiene and (b) is styrene.

4. A composition according to claim 1 wherein in the preparation of (3) there is introduced as final monomer (c) at least one compound of 2–30 carbon atoms containing a vinyl group with at least one polar group substituted on the vinyl group, said polar substituted group containing no members from the groups consisting of hydroxyl, primary amine, secondary amine, oxirane and terminal acetylenic groups, said compound containing a vinyl group having the formula:

$$H_2C=CR_1X_1$$

wherein $R_1$ is selected from the group consisting of hydrogen, alkyl, aryl, substituted alkyl, substituted aryl and $X_2$, where $X_1$ and $X_2$ are polar groups containing at least one atom in addition to carbon and hydrogen, the final monomer representing up to about 35% by weight of the total composition (3), said final monomer (c) being added only after all of monomers (a) and (b) have substantially completely reacted.

5. A composition according to claim 1 where in the preparation of (3) there is introduced in at least one stage of the polymerization process 0.01 to 1% based on the weight of composition (3) of a cross-linking agent having the formula:

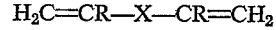

$$H_2C=CR-X-CR=CH_2$$

wherein R is selected from the group consisting of hydrogen and lower alkyl and X is selected from the group consisting of aliphatic and aromatic divalent radicals inert to the polymerization reaction.

6. A composition according to claim 5 wherein the cross-linking agent is divinylbenzene.

7. A composition according to claim 1 where (1), (2), and (3) are present in a ratio of 50–98%, 1–25% and 1–25%, respectively.

8. A high-impact polystyrene molding composition according to claim 1 wherein (3) is present in an amount of from about 1.1 to about 15.0% by weight.

References Cited

UNITED STATES PATENTS

| | | | |
|---|---|---|---|
| 2,755,270 | 7/1956 | Hayes | 260—876 |
| 2,802,808 | 8/1957 | Hayes | 260—876 |
| 3,041,310 | 6/1962 | Luftglass et al. | 260—876 |
| 3,223,691 | 12/1965 | Greenberg et al. | 260—93.5 |

FOREIGN PATENTS 821,971 10/1959 Great Britain.

GEORGE F. LESMES, *Primary Examiner.*

K. E. KUFFNER, *Assistant Examiner.*

U.S. Cl. X.R.

260—93.7, 880, 892